Jan. 18, 1927.
F. MATTHIESEN
1,614,623
AUTOMATIC AUTOMOBILE LOCK
Filed Sept. 11, 1924    2 Sheets-Sheet 1
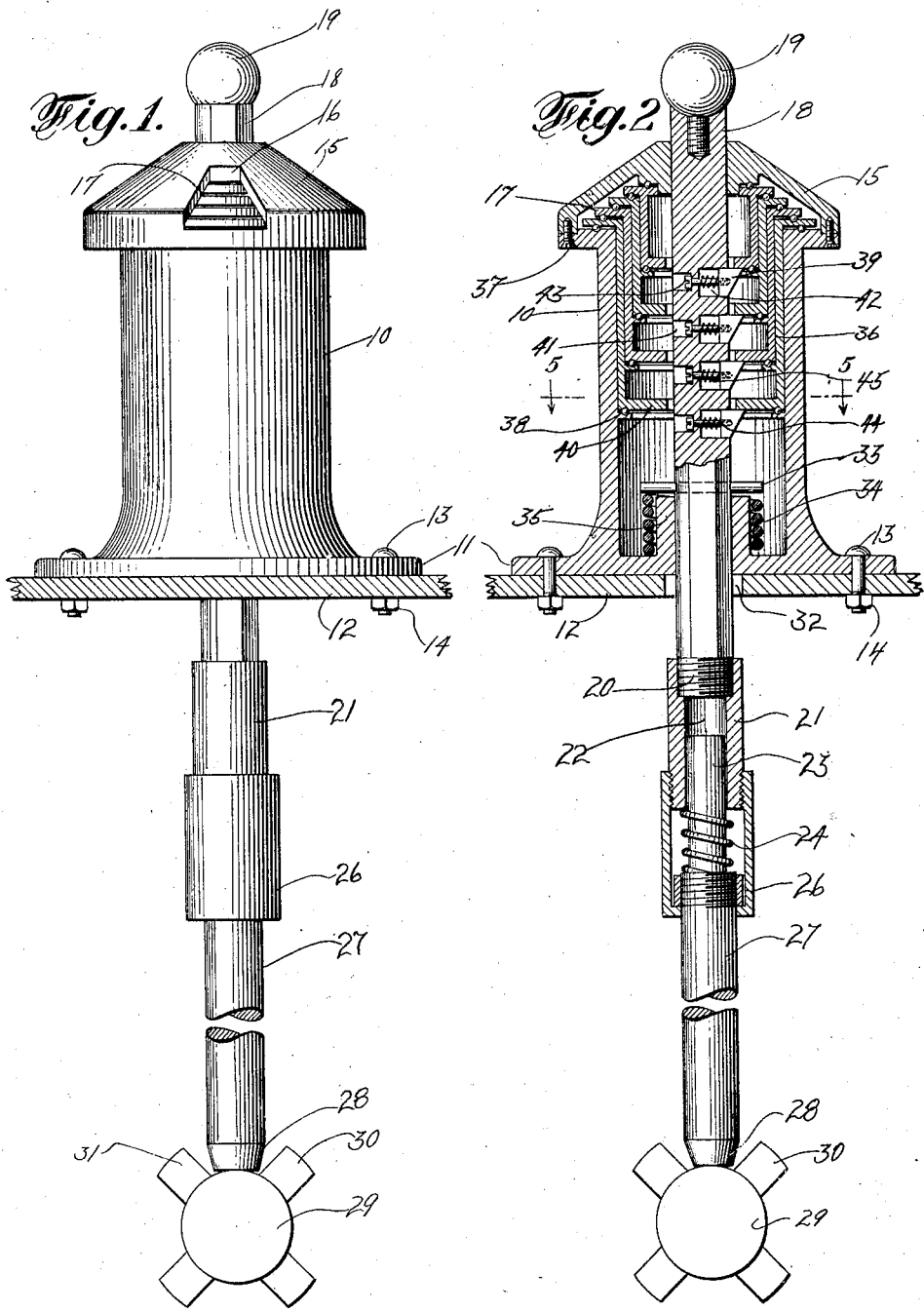
INVENTOR
Fred Matthiesen.
BY
his ATTORNEY Jan. 18, 1927.
F. MATTHIESEN
1,614,623
AUTOMATIC AUTOMOBILE LOCK
Filed Sept. 11, 1924   2 Sheets-Sheet 2
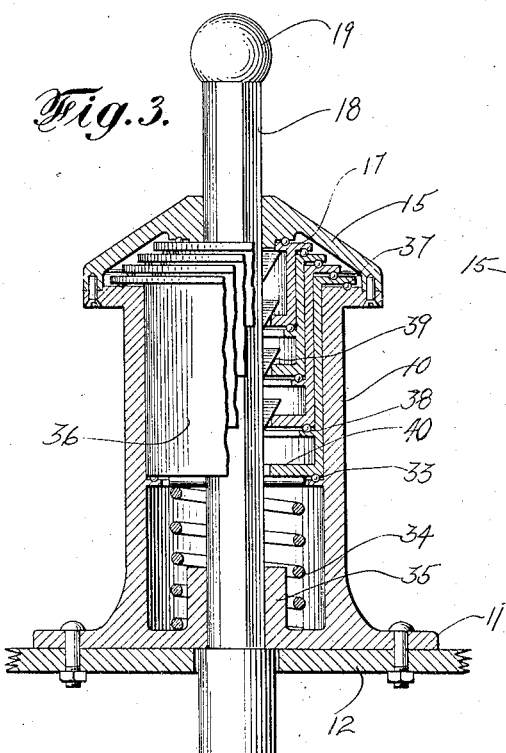
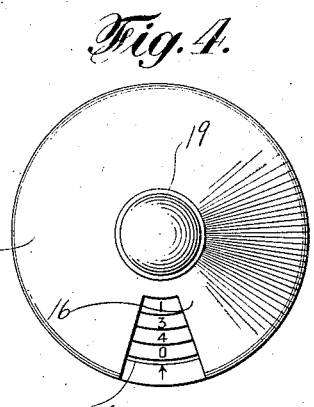
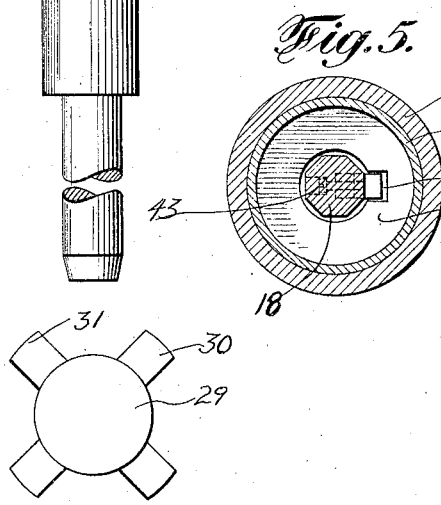
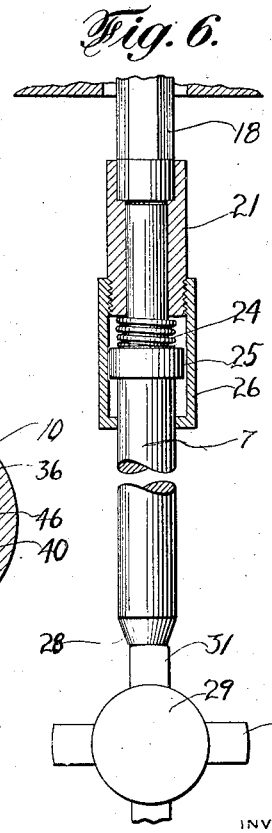
INVENTOR
*Fred Matthiesen.*
BY
*his* ATTORNEY Patented Jan. 18, 1927.

1,614,623

UNITED STATES PATENT OFFICE.

FRED MATTHIESEN, OF CINCINNATI, OHIO.

AUTOMATIC AUTOMOBILE LOCK.

Application filed September 11, 1924. Serial No. 737,192.

The present invention relates to theft preventing devices, particularly to devices intended to positively prevent the theft of automobiles or motor vehicles, and it is the principal object of the invention to provide a device which effectively locks the engine shaft against rotation.

Another object of the invention is the provision of a lock having means for locking the driving shaft of an engine so that nobody except the person in possession of a certain combination can drive the engine after the lock has been applied.

A further object of the invention is the provision of an inexpensive locking device which will operate positively under all conditions and in which the lock bolt enters between two locking blocks on the engine shaft.

A still further object of the invention is the provision of means allowing the projection of the lock bolt between two of these locking blocks in case the shaft of the engine is in a position that the top of the locking blocks is engaged by the lock bolt preventing, for the time being at least, a positive locking of the shaft but allowing a projection of the lock bolt into its locking position upon an attempted operation of the engine shaft.

These and other objects of my invention will become more fully known as the description thereof proceeds and will then be specifically pointed out in the appended claims.

In the accompanying drawings, forming a material part of this disclosure:—

Figure 1 is a front elevation of the device constructed according to the present invention.

Figure 2 is a view similar to Figure 1 with the housing in longitudinal section to illustrate the interior construction and the locking bar in its operative position.

Figure 3 is a view similar to Figure 2 with the locking bar in its unlocking position of rest.

Figure 4 is a top plan view of the device.

Figure 5 is a cross-section on line 5—5 of Figure 2.

Figure 6 shows the construction of the locking bar and the engagement of the same with the top of one of the locking blocks on the engine shaft.

The device consists of a housing 10 having a foot flange 11 bolted to the foot board of the bottom 12 of an automobile chassis by bolts 13 carrying locking nuts 14. The housing has an upper, roof-like cover 15 with a substantially V-shaped slot 16 through which the upper disc-like flanges 17 of the combination cylinders are displayed carrying the combination numbers.

A locking bar 18 has a foot operated head 19, and a lower, threaded end 20 to which is attached the upper end of a sleeve 21 in the hollow central part 22 of which a pin 23 is slidable, the pin being encircled by a spiral spring 24, its upper end abutting the lower end of the sleeve 21 while its lower end rests upon the collar 25 slidable within a sleeve 26 threaded onto the lower end of sleeve 21 and allowing the passage of the lower section 27 of the locking bar 18 which section has a bevelled extremity 28 to engage the engine shaft 29 between two adjacent locking lugs or blocks 30, 31, fixed to extend rigidly therefrom.

The locking bolt 18 passes through an opening 32 in the bottom 12 of the chassis and a cross-pin 33 in the bar 18 is pressed upward by the action of a strong spring 34 wound around a boss 35 of the housing bottom or flange 11, which rests with its lower end against the bottom 11. Under the action of the spring 34, the pin 33 engages the lower edge of an outer sleeve or cylinder 36 carrying an upper flange disc 17 on which the combination numerals are displayed, and ball bearings are provided to ensure a smooth working or rotation of the cylinders 36.

The locking bar 18 is held in its locking position by means of a plurality of latches 39, for instance four as shown, which engage below the ring-shaped bottom parts 40 of the cylinders 36. A section of the locking bar 18 passes through the ring-shaped bottom parts of the cylinders 36 and is recessed on both sides as at 41 and 42, and the heads 43 of bolts 44 are located in the recesses 41 while their shafts carry the latches 39, and springs 45 are wound around the latches in recesses 42 engaging the latches at one end and the rear walls of the recesses at the opposite end; the ring-shaped bottom parts of the combination cylinders are provided with lateral extended openings 46 through which the latches can pass when the combination is properly set, under the action of spring 34.

The device operates as follows:—

Assuming the combination cylinders are so set that all of the latches can pass through the respective slots in the ring-shaped bottoms of the cylinders and the locking bolt can be depressed to bring its lower end into engagement with the engine shaft between two of the blocks thereon, the combination is then destroyed and the spring 34 will assume the position illustrated in Figure 2 so that the shaft will be effectively locked against operation in either direction. Only a person having knowledge of the proper combination will be able to rotate the cylinders to bring their slots 46 into alignment again so that when the spring 34 will be allowed to expand and the shaft 18 to project from the housing, and its lower end will be disengaged from between the blocks on the engine shaft, so that the latter will be entirely free to rotate.

If accidentally the shaft rests in a position in which the lower end of the locking bolt engages the top of one of the locking bolts, an attempt to rotate the engine shaft will allow a dropping of the bolt end between the two blocks by the action of the spring 24 and the displacement of pins 23 in hollow space 22. A rotation of the locking bolt is prevented by its hexagonal form, and its up and down motions are limited by cross-bar 33 which may also be a ring, etc.

It will be clear that changes may be made in the general arrangement of the device and in the construction of the minor details thereof without departing from the scope and spirit of the invention as specified in the appended claims.

Having thus described my invention, what I claim as new and desire to secure by Letters Patent, is:—

1. In a lock, a motor shaft, a recessed locking bolt to contact with said shaft, means on said shaft to engage said bolt, a housing, a plurality of cylindrical combination elements, annular bottoms for said cylindrical combination elements having openings therein, upper flanges on said cylindrical elements bearing the combination numbers, spring pressed latches at the ends of said bolts to engage said cylinder flanges, said latches being slidable through the openings in said flanges to allow setting of the combination to operate said locking bolt and locking of said bolt upon the dismantling of the combination, and means for extending said bolt.

2. In a device of the class described, the combination of an engine shaft and spaced abutments thereon, with a plurality of manually operated permutation cylinders, a bolt to engage between two of said abutments, said cylinders allowing operation of said locking bolt for locking the shaft in one position, and locking of the same in the other of their positions, and means for extending said bolt upon the partial rotation of said shaft and the engagement of the bolt end with the top of one of said abutments.

In witness whereof I have signed my name to this specification.

FRED MATTHIESEN.